United States Patent [19]

Carney

[11] 4,108,779
[45] Aug. 22, 1978

[54] OIL WELL FLUIDS AND DISPERSANTS
[75] Inventor: Leroy L. Carney, Duncan, Okla.
[73] Assignee: Halliburton Company, Duncan, Okla.
[21] Appl. No.: 677,199
[22] Filed: Apr. 15, 1976

Related U.S. Application Data

[60] Continuation-in-part of Ser. No. 356,239, May 1, 1973, abandoned, Ser. No. 500,999, Aug. 27, 1974, abandoned, and Ser. No. 543,723, Jan. 24, 1975, abandoned, which is a division of Ser. No. 353,060, Apr. 20, 1973, Pat. No. 3,896,031, said Ser. No. 500,999, is a division of Ser. No. 417,431, Nov. 19, 1973, Pat. No. 3,850,248.

[51] Int. Cl.$^2$ ............................. C09K 7/02; C09K 7/06
[52] U.S. Cl. .................................. 252/8.5 P; 166/291; 252/8.5 C; 252/8.55 R; 252/355
[58] Field of Search ........... 252/8.5 M, 8.5 P, 8.55 R, 252/308, 309, 357; 166/291

[56] References Cited

U.S. PATENT DOCUMENTS

| | | | |
|---|---|---|---|
| 2,099,825 | 11/1937 | Rolshausen et al. | 252/8.5 |
| 2,946,746 | 7/1960 | Keller | 252/8.5 |
| 2,994,660 | 8/1961 | Reddie et al. | 252/8.5 |
| 3,021,277 | 2/1962 | Hoeppel | 252/8.5 |
| 3,108,068 | 10/1963 | Weiss et al. | 252/8.5 |
| 3,244,638 | 4/1966 | Foley et al. | 252/308 |
| 3,625,286 | 12/1971 | Parker | 166/291 |
| 3,849,316 | 11/1974 | Motley et al. | 252/8.5 |

FOREIGN PATENT DOCUMENTS 578,341  6/1959  Canada.

Primary Examiner—Herbert B. Guynn
Attorney, Agent, or Firm—Robert S. Nisbett; Thomas R. Weaver; John H. Tregoning

[57] ABSTRACT

The invention of this application is a dispersant system with various embodiments and subcombinations with exceptional dispersions including colloidal suspensions, aqueous hydrocarbon emulsions and emulsions with solid particulate additives dispersed therein. The basic dispersant system which makes the high stability, high weight dispersions or emulsions possible comprises an emulsifier composition containing a fatty acid amide, oleic acid, dimerized oleic acid and a particular type of surfactant dispersant. For certain applications the following optional components can be used: particulate filler or carrier; a hydrocarbon phase which can be either liquid or a colloidal solid; water soluble salts weighting agents; insoluble salts and conventional additives. This dispersant system can be used for aqueous hydrocarbon well fluids such as spacer and packer fluid, for aqueous hydrocarbon dispersions such as asphaltic colloids in an oil free fluid for sealing and lubricating a well bore, or for other aqueous hydrocarbon emulsions which can be used with salts, weighting agents, etc. for a drilling fluid.

19 Claims, No Drawings

OIL WELL FLUIDS AND DISPERSANTS

This application is a continuation-in-part of the following applications: Ser. No. 356,239 filed May 1, 1973 (now abandoned); Ser. No. 500,999 filed Aug. 27, 1974 (now abandoned) which is a division of Ser. No. 417,431 filed Nov. 19, 1973 (now U.S. Pat. No. 3,850,248); and Ser. No. 543,723 filed Jan. 24, 1975 (now abandoned) which is a division of Ser. No. 353,060 filed Apr. 20, 1973 (now U.S. Pat. No. 3,896,031). Said earlier applications and are incorporated herein by reference.

Aqueous hydrocarbon dispersion type fluids have been used advantageously in the oil industry for many years. Emulsion drilling fluids possess many advantages over regular muds such as bringing about longer bit lives, improved hole conditions, etc. The most commonly used emulsion drilling fluids are oil-in-water types wherein oil is the dispersed phase and water the continuous phase. Inverted or water-in-oil emulsions wherein oil is the continuous phase and water is the dispersed phase have also been used to advantage. However, such inverted emulsion drilling fluids have heretofore been relatively costly and sensitive to conditions of preparation and use. Further, such water-in-oil emulsions have heretofore been unstable at high temperatures, i.e., at temperatures above about 300° F the emulsions revert to oil-in-water emulsions or break and separate. At temperatures above about 500° F the emulsions generally do not remain fluid. In addition, the rapid addition of weighting materials to prior invert emulsion drilling fluids often causes the fluids to become highly viscous and/or to break and separate.

Emulsifiers used to form prior emulsion fluids generally comprise both solid and liquid components or additives which must be shipped separately and mixed at the site of preparation of the emulsion.

Aqueous fluids containing colloidal hydrocarbon suspensions of solids are utilized in industry in a variety of applications. In drilling operations, water-base drilling fluids are frequently used to minimize pollution in the event the drilling fluids escape into a body of water. In order to improve the performance of such aqueous drilling fluids, namely, to bring about better lubrication of the bit and drill string and reduce hole trouble such as bit balling, heaving shale, hole enlargement, etc., asphaltic solids have been dispersed in the drilling fluids. Since colloidal asphaltic solids are neither soluble or directly dispersible in water, it has heretofore been necessary to first add the asphaltic solids to oil, e.g., diesel oil, and then combine the oil and solids with the aqueous fluid. The use of oil to achieve suspension of the asphaltic solids in aqueous drilling fluids is unsatisfactory. When the asphaltic solids are suspended in the internal oil phase of the emulsion, the desired deposit of the asphaltic solids on the walls of the well bore is restricted.

In cementing well casings and deep liners in a well bore, the drilling mud employed for drilling is displaced by the cement. Contact between the displacing cement and an incompatible drilling fluid has often resulted in detrimental interactions.

The incompatibility can contribute to failure to obtain a satisfactory bond between the cement and the bore hole. Where a water based drilling fluid is in use, adequate removal of the mud and mud cake from the bore hole is difficult. When oil based (invert) drilling fluids are used, the incompatibility often results in contamination or intermingling of the mud with the cement, and of the cement with the mud. Extreme viscosities often arise from such commingling, causing surge pressures and pumping problems. In some cases this leads to undesirable formation breakdown. When the solids are commingled with the cement, premature setting of the cement is often induced and, conversely, when drilling fluids are contaminated with solids from the cement slurry, the properties advantageously characteristic of drilling fluids are adversely affected. For example, the drilling fluids of the invert emulsion type (Oil base) can be caused to have the emulsion broken, giving higher viscosities and higher pump requirements.

It has become a frequent practice to separate these two incompatible slurries by a spacer fluid. Different types of spacer fluids have been utilized. In some instances, several types of spacer fluids are used for one displacement job. This requires expensive equipment and specialized handling. Spacer oils do not allow the cement to adequately hydrate, and the oil thins the mud. Oil spacer cannot be weighted up to match the density of the mud in order to effect efficient removal thereof and causes underbalance of the hydrostatic column in the annulus of the well.

By the present invention, novel dispersions, dispersing agents and additives for forming dispersions of hydrocarbons, liquids or solids in aqueous fluids are provided. Novel aqueous drilling fluids containing colloidal suspensions of asphaltic solids in the absence of oil and methods of preparing such aqueous drilling fluids are provided.

Improved, substantially universal spacer fluids are provided having excellent temperature and pressure stability which are capable of spacing cements from substantially all mud systems employed in the drilling of oil and gas wells. Thus, the spacer fluids of the invention are compatible with water base mud systems of the ferro-chrome lignosulfonate and polymeric types. They are also compatible with oil base mud systems in all the weight ranges over which such systems are customarily used. Spacer slurries of this invention are compatible with substantially all oil-in-water emulsions, as well as water-in-oil emulsions. Spacer fluids of the invention are compatible with the types of cements commonly in use for oil well cementing, and do not significantly affect their viscosities or the pumping times required. The spacer fluids of this invention can also be used between two drilling muds. The spacer fluids contemplated by the invention can be weighted to a density over a wide range, and can be easily tailored to have a density between the density of the drilling fluid and the density of the cement slurry in the system in which the spacer is to function.

The spacer fluids of this invention are basically fresh water-in-oil emulsions containing approximately equal volume parts of a normally liquid hydrocarbon oil and water with about 15–40 pounds per barrel of an emulsifier, about 0.5–10 pounds per barrel of a particular type surfactant dispersant, and optionally, a weighting material in an amount effective to impart a density to the spacer fluid of from about 8–20 pounds per gallon.

By the present invention improved dispersion fluids are provided having excellent temperature stability and other desired characteristics. Improved water-in-oil emulsions are prepared through the utilization of novel emulsifiers of the present invention which can be liquid or free-flowing powders. The emulsifiers can be used to prepare inverted emulsions from fresh water or brines with a variety of oils. Further, the improved emulsion drilling fluids prepared with the emulsifiers can be weighted with a variety of conventional weighting materials at rapid rates without detrimental results.

Formulae prepared with each individual component adsorbed on lime and tested in an emulsion system show that all of the components are necessary to obtain a preferred formula to produce a system with the necessary properties of a drilling fluid that exhibits high temperature stability, fluid loss control and weight suspension at high temperatures and pressures. Preferred formulae will make stable emulsions with the internal aqueous fluid containing sodium chloride, calcium chloride, and magnesium chloride, thus showing that it is very versatile where prior art compositions are not.

The emulsifiers of the present invention include a particular type of fatty acid amide which can be in liquid form or adsorbed on a powdered solid carrier such as lime and diatomaceous earth. The preferred fatty acid amide is an oleyl amide thought to be a nonionic emulsifier and is preferably present in an amount in the range of from about 1-20% by weight. The term "lime" is used herein to include any basic polyvalent metal salt such as calcium oxide, calcium hydroxide, magnesium oxide or mixtures thereof. The term "emulsifier" as used herein also is used in a specialized sense as including both the solid particulate carrier material and all the emulsifier components adsorbed on the surface thereof, even though only one or a few of the latter materials may function as an emulsifier per se. Other solid particulate or powdered carriers, such as talc, silica, barite, carbonates, clay, etc., which will adsorb the emulsifier or the components thereof can be used.

A specific preferred emulsifier of the present invention includes a first type of oleyl amide, oleic acid and dimerized oleic acid adsorbed on a powdered carrier selected from the group consisting of lime and diatomaceous earth. The oleyl amide is present in an amount in the range of about 1-20% (preferably 2-10%) by weight of emulsifier. The dimerized oleic acid is present in an amount in the range of about 2-20% by weight of the emulsifier. The oleic acid is present in an amount in the range of about 5-15% by weight.

The first type of fatty acid amides useful as the basic emulsifier of the present invention can be prepared as the reaction product of fatty acid and a di-lower alkanol amine such as diethanolamine. The fatty acid or oleyl amide herein referred to is considered the primary emulsifying component in the compositions of the invention, and preferably is derived from reacting a fatty acid containing about 12-18 carbon atoms with an amine. The amide reaction product preferably contains about 16-22 carbon atoms. The most preferred amide is prepared by condensing oleic acid with diethanolamine.

Dispersing agents of the present invention aqueous contain a surfactant-dispersant comprised of mixtures of a second type of fatty acid amide and a waste lignin liquor, wherein the waste lignin liquor is a product of the sulfite process or the Kraft process used in the wood pulping industry. This lignin is sulfonated with a sulfur content preferably about 1-3% by weight.

While the preferred surfactant-dispersant agent is produced by combining a particular type of oleyl amide with waste lignin liquors, fatty acid amides other than oleyl amides are useful herein. Such amides are prepared from saturated and unsaturated fatty acids having in the range of about 14-18 carbon atoms per molecule. Such acids include but are not limited to oleic acid, linoleic acid, linolenic acid, stearic acid, palmitic acid, myristic acid and myristoleic acid.

The oleyl amide constituting the principle component of the emulsifier used in the spacer fluid functions to reduce the interfacial tension between the oil and water emulsions, so that when the mixture is agitated, a stable water-in-oil emulsion is readily produced.

In addition to the oleyl amide, the emulsifiers used in the spacer fluid of the present invention preferably also include dimerized oleic acid and are present in an amount of up to about 30 weight percent of the total weight of the emulsifier. Preferably, about 5-15 weight percent is used. The dimerized oleic acid, when employed, functions to increase the viscosity of the spacer fluid, enabling it to be weighted with a variety of conventional weighting materials, such as barium sulfate, calcium carbonate, iron oxides, lead sulfides and cement solids, for selective adjustment of the weight (density) of the spacer over a wide range. When concentrations greater than about 30 weight percent of the dimerized acid are utilized in the emulsifier, the spacer fluid becomes undesirably thick and its viscosity increases pumping requirements to an undesirable level. For most weighted spacer fluid applications, an amount up to about 10 weight percent has been found to be optimum.

It should be pointed that in relatively low temperature environments and on occasions when very little or no weighting material is to be added to the spacer fluid, the dimerized oleic acid can be omitted from the emulsifier composition. These occasions are relatively rare, however, and in most instances, the dimerized acid will preferably be utilized. In order to reduce the overall cost of the emulsifier composition, undistilled dimerized oleic acid can be used in lieu of pure dimerized oleic acid.

Where oleic acid is employed, it is utilized in a range of about 3-15 weight percent of the total weight of the emulsifier. Preferably, about 3-10 weight percent of the oleic acid is used. The most suitable amount is about 5 weight percent. The addition of this material helps to stabilize the spacer fluid emulsion against breaking upon contact with salt containing subterranean waters, and particularly high brine content connate waters. It is also a very useful additive where the cement in use contains significant quantities of sodium chloride.

It should be pointed out that where oleic acid is included in the emulsifier composition, economic considerations will frequently dictate the use of red oil or undistilled oleic acid, rather than pure oleic acid. Undistilled dark oleic acid in admixture with red oil can also be utilized instead of pure oleic acid. The undistilled dark oleic acid contains about 75% oleic acid and lesser amounts of linoleic, linolenic, palmitoleic, palmitic, myristic, myristoleic and stearic acids. The red oil component of such undistilled dark oleic acid mixture is the residue which is produced in a conventional oleic acid distillation process, and contains the described oleic acid, as well as quantities of the other acids mentioned above, including a minor amount of some dimerized acids.

An emulsifier which has been found to be particularly effective in the spacer fluids of the invention is adsorbed on powdered slaked lime in an amount in the range of about 55-78%. The other components are oleyl amide, derived from the condensation of oleic acid with diethanolamine, in an amount in the range of about 3-10 weight percent and dimerized oleic acid present in an amount in the range of about 8-12 weight percent.

The most preferred single emulsifier composition for use in the spacer fluids of the invention consists essentially of powdered slaked lime in an amount of about 68.1 weight percent, about 4.9 weight percent oleyl amide, undistilled oleic acid present in an amount of about 5 weight percent, red oil present in an amount of about 5 weight percent, and undistilled dimerized oleic acid present in an amount of about 10 weight percent.

For fluid loss control with the spacer fluids, it may be desirable to include a conventional particulated solid asphaltic resin which is added to the spacer fluid composition in an amount in the range of about 1–30 (preferably 1–20) weight percent, based on the weight of the emulsifier. Usually about 10–14% of an asphaltic resin will provide adequate fluid loss control. Suitable asphaltic resins include those which have a melting point between 250° F and 400° F. They may be kettle bottoms, air blown resins or naturally occurring resins. Where such asphaltic resins are used, as little as about 55 weight percent of the lime carrier can be utilized.

The novel additives of this invention for forming colloidal suspensions of colloidal asphaltic solids in aqueous solutions, e.g., water base drilling fluids, in the absence of oil are comprised of a mixture of colloidal asphaltic solids and a surfactant dispersant comprised of an amide formed from a saturated or unsaturated fatty acid having in the range of about 14 to about 18 carbon atoms therein, and waste lignin liquor. Preferably, the dispersant is present in the additive in an amount in the range of about 1–50% by weight thereof. At a dispersant concentration below about 1% by weight, inadequate dispersing of the asphaltic solids results, and at concentrations of the dispersant above about 50% by weight excess dispersant is present. A concentration of dispersant in the additive of about 4% by weight of the additive is preferred.

Asphaltic colloidal material used in this invention includes any of those bituminous material used heretofore and known in the prior art such as natural asphalts or those derived from petroleum refining, for example, by steam refining and/or air blowing, etc. The asphaltic material employed herein preferably is a solid at temperatures up to about 260° F. Asphaltic materials which are solids up to about 260° F can be conveniently subjected to size reduction operations to produce the colloidal particles useful herein.

A preferred additive comprises colloidal asphaltic solids and dispersant present in the additive in an amount in the range of about 1–50% by weight of the additive, said dispersant being comprised of a mixture of oleyl amide and waste lignin liquor, the waste lignin liquor being present in the dispersant in an amount in the range of about 25–75% by weight thereof.

The most preferred additive of this invention for forming colloidal suspensions of asphaltic solids in aqueous solutions in the absence of oil comprises colloidal asphaltic solids and a surfactant dispersant present in the additive in an amount of up to about 4% by weight of the additive. Said dispersant is comprised of a mixture of oleyl amide and waste sulfite liquor, and the waste sulfite liquor being present in the dispersant in an amount of about 50% by weight thereof.

In utilizing the above-described additives of this invention for forming aqueous drilling fluids having colloidal suspensions of asphaltic solids therein in the absence of oil, the additive is combined directly with the aqueous drilling fluid in an amount in the range of from about 0.5% to 2% by weight thereof. Generally, the additive is combined with the drilling fluid while the drilling fluid is being circulated which causes the immediate dispersing of the colloidal asphaltic solids in the drilling fluid. At an additive concentration in the drilling fluid below about 0.5% by weight, little improvement in the properties of the drilling fluid is realized. Concentrations of the additive above about 2% by weight in the drilling fluid do not add appreciably to the benefits achieved by the additive.

The aqueous drilling fluids formed using the additives of the present invention are superior to heretofore known and used aqueous drilling fluids in that they do not contain oil. The suspended asphaltic materials contained in the drilling fluids readily plate out on the solids being drilled, on the solids in suspension, and on the walls of the well bore, resulting in better fluid loss control as well as improvement in the other benefits mentioned above relating to the use of asphaltic solids in drilling fluids. In addition, the improved drilling fluids of the present invention are more economical to prepare and use as compared to heretofore used oil-in-water emulsion type drilling fluids due to oil and an emulsifying agent not being required.

As mentioned above, the first type of oleyl amide functions to bring about the reduction of interfacial tensions between the water and oil to form the desired water-in-oil emulsion. However, while oleyl amide readily produces emulsions when pure water is utilized as well as when calcium and magnesium brines are used, it has been found that oleyl amide is not as effective as desirable in forming water-in-oil emulsions using sodium chloride brines. In order to provide an emulsifier composition which can be used to produce the improved water-in-oil emulsions of the present invention using sodium chloride brines as well as other brines, oleic acid is included in the emulsifier in an amount in the range of about 3–40% by weight of the emulsifier. At a concentration below about 3% weight, the oleic acid will not effectively emulsify sodium chloride brine and at a concentration of above about 40% in the emulsifier composition the free-flowing properties of the composition are impaired.

In order to produce an improved water-in-oil emulsion particularly suitable for use as a drilling fluid or mud, an agent for facilitating dispersion of particulated solid weighting material in oil is included in the emulsifier composition. A variety of conventional dispersing agents can be used with some beneficial effect. For example, dispersing agents such as sulfonated paraffin, rosin acids and rosin soaps when added to the emulsifier in amounts in the range of from about 0.5% to about 20% by weight of the emulsifier are effective to facilitate dispersing conventional weighting materials such as calcite, barite, etc. in the invert emulsion produced.

The spacer fluid further includes a strong surfactant dispersant component. This component of the spacer fluid composition functions to disperse and suspend particulated solid weighting materials in the spacer when such are utilized, and also functions to prevent solid components which may enter the spacer fluid from either the drilling mud or the cement, between which it is positioned, from breaking or detrimentally affecting the emulsion. A variety of conventional dispersants can be used, including sulfonated paraffins, resins acids and resin soaps (such as disproportionated resin acids derived from the kettle bottoms produced in the distillation of tall oils, and the soaps of such acids). Mixtures of sulfonated lignin with a certain particular second type of fatty acid amide are preferred fatty acid amide dispersants to be included with the emulsifier. Such surfactant dispersants are incorporated in the spacer fluid in an amount of about 0.5-10 pounds per barrel. Preferably, the amount of the surfactant dispersant utilized is about 2-8 pounds per barrel. When the most preferred surfactant dispersant hereinafter described is employed, the amount utilized in the spacer fluid is most suitable up to about 4 pounds per barrel.

The preferred surfactant dispersant compositions are those constituted by mixing at least one sulfonated lignin, such as from waste sulfite liquors, with a second type of fatty acid amide. Such a fatty acid amide can be derived from the reaction of a fatty acid chloride with an amino sulfonic acid containing 1-6, and preferably 2-5, carbon atoms. The sulfonic acid can have alkyl and/or aryl radicals having 1-6 carbon atoms and one or more sulfonic acid groups or salts thereof. Thus, the surfactant dispersant contains a second type of fatty acid amide. A surfactant dispersant which has been found to be particularly suitable and highly effective in the spacer fluid compositions, and which constitutes the preferred dispersing agent for use in accordance with the present invention, is produced by reacting oleyl chloride with N-methyltaurine. This reaction product, referred to as an oleyl amide, is mixed with waste sulfite liquor in an amount in the range of about 25-75 weight percent of the sulfite liquoroleyl amide mixture. The oleyl amide reaction product and the sulfite liquor are preferably mixed in about equal amounts.

In addition to functioning to disperse and aid in suspending solid particles, the surfactant dispersant allows such conventional weighting materials as particulated solid quartz, calcite, barite, iron oxide, etc. to be rapidly dispersed in the water-in-oil emulsion. This end product serves as a powerful wetting agent for solids, allowing large surface are in the oil phase with low viscosity.

The above described amides can be prepared by various conventional procedures. For example, a fatty acid described above and phosphorus trichloride starting materials can be reacted to form a chloride intermediate. This in turn can be reacted with N-methyltaurine to form the amide. The N-methyltaurine can be prepared by reacting sodium bisulfite with ethylene oxide to form an intermediate which is in turn reacted with monomethylamine.

The term "waste lignin liquor" is used herein to mean the waste liquor produced in the sulfite or Kraft paper processes for pulping wood and contains lignin. These lignins usually contain less than about 8% sulfur but preferably less than about 3% sulfur. In the sulfite process, for example, wood is cooked under pressure with an aqueous liquor containing a sulfite compound and, frequently, sulfurous acid. Sodium bisulfite is generally used as the sulfite compound in the process, but ammonium, calcium or magnesium bisulfite can also be used. During the cooking of the wood which contains lignocellulose, the sulfite compound reacts preferentially with the lignin, liberating the cellulose which is separated in the form of a pulp from the liquor. The liquor remaining after the separation is known as waste sulfite liquor and is an aqueous solution of lignin sulfonic acids, wood sugars and inorganic compounds. The lignin contains 5-6% sulfur, whereas in the Kraft process the lignin is solubilized at high pH using sodium hydroxide and sodium sulfite. The Kraft process; lignin is not sulfonated but can be separated and subsequently sulfonated to varying degrees.

In the preparation of the dispersing agent of the present invention, the waste lignin liquor is preferably mixed with the amide used in an amount in the range of about 25-75% by weight of the mixture. At concentrations above and below this range the effectiveness of the dispersant decreases. The mixture can be used in liquid form for dispersing colloidal solid material in aqueous solutions, but preferably it is dried in a conventional manner such as by spray drying to form a substantially dry solid product.

The dispersant of this invention can be utilized for dispersing a variety of colloidal solid or liquid materials in aqueous solutions in the absence of oil, which materials are normally not dispersible in water unless first dispersed in oil, etc. The dispersing agent has a greater affinity for oil than it has for asphaltenes. Accordingly, the addition of oil to an aqueous system containing colloidal asphaltenes dispersed by the dispersing agent of this invention causes the asphaltenes to agglomerate. Therefore, oil should not be added to an aqueous system utilizing the dispersant described herein.

The different components of the emulsifier or dispersant system of this invention can be used as a combination, in various subcombinations or alone according to the teachings of this application. A particularly useful application for the surfactant dispersant component is in the dispersion of hydrocarbons which present problems in association with aqueous acids. These hydrocarbons are typically the higher molecular weight hydrocarbons such as paraffin or asphaltenes which precipitate or form a gum which in turn restricts flow and presents handling problems in cleaning out wells after using oil based fluids in acidizing or fracturing formations where these hydrocarbons are present. Thus, the dispersant can be used alone or with other additives in aqueous acids, aqueous fracturing fluids or work-over fluids where asphaltenes frequently cause problems. When asphaltenes or other materials which are difficult to disperse are encountered within a well or subterranean strata, the dispersant effectively suspends these materials to keep the fluid viscosity low, prevent clogging and prevent problems in handling fluid. The fatty acid amide dispersant, preferably the oleyl amide-lignin mixture in liquid form, can be added to the acidic fluid in a concentration of up to about 12 pounds per barrels (PPB) preferably up to about 8 PPB. Higher concentrations can be used but are not usually economical. The dispersant effectively disperses the hydrocarbons and prevents precipitation or gum formation which interfers with flow of the aqueous fluid.

A preferred emulsifier for water-in-oil emulsions of the present invention comprises powdered lime present in the composition in an amount in the range of about 60-65% by weight, oleyl amide present in an amount in the range of about 2-5% by weight, oleic acid present in an amount in the range of about 3-30% by weight, dimerized oleic acid present in an amount in the range of about 8-12% by weight, the preferred dispersant described present in the emulsifier in an amount in the range of about 1-10% by weight and particulated solid asphaltic resin present in an amount in the range of about 5-15% by weight. Further, the oleic acid utilized in the emulsifier composition is preferably a mixture of undistilled oleic acid and red oil present in equal amounts.

The most preferred emulsifier composition of the present invention is comprised of powdered lime present in the composition in an amount of about 61.6% by weight, oleyl amide present in an amount of 3.9% by weight, undistilled oleic acid present in an amount of about 5.1% by weight, red oil present in an amount of about 5.1% by weight, undistilled dimerized oleic acid present in an amount of about 10.3% by weight, a dispersant prepared by mixing oleyl amide with a like amount of waste sulfite liquor and spray drying the mixture, said dispersing agent being present in an amount of about 2% by weight; and particulated solid asphaltic resin present in an amount of about 12% by weight.

In preparing the emulsifier compositions of the present invention, the liquid oleyl amide can be sprayed onto the powdered lime or diatomaceous earth while mixing so that the oleyl amide is adsorbed. The oleic acid and dimerzied oleic acid (preferably undistilled dimerized oleic acid) are mixed together and heated to a temperature of from about 120° F to about 150° F to facilitate their easy adsorption. The heated liquid mixture is then sprayed on the lime or diatomaceous earth while mixing so that it is adsorbed thereon, and the lime or diatomaceous earth remains in a freeflowing powdered state. The dispersing agent used and particulated asphaltic resin are next combined with the mixture to form the final composition. Conventional mixing and blending apparatus can be utilized for carrying out the above-described procedures, and the final emulsifier composition produced is a dry freeflowing powder which can be shipped and stored in paper sacks or other conventional dry material containers.

Water utilized in the spacer fluid is fresh water. This term is used in contrast to water having a high dissolved inorganic salts content, and particularly a significant content of chloride salts. The fresh water of the invention can be defined as water having an overall dissolved chloride salts content of less than about 1000 ppm, and a total hardness of less than 500 ppm.

The oil utilized in preparing the emulsion is a normally liquid hydrocarbon having a viscosity up to about 100 centipoise. It can be diesel oil, crude oil, kerosene and various other hydrocarbons or mixtures of hydrocarbons. Diesel oil is a preferred oil.

The oil and fresh water are utilized in the spacer fluids of the invention in volume ratios of from about 40:60 to about 60:40 oil to water. Preferably, about 45-55 parts by volume of oil are combined with 55-45 parts by volume of water. In general, the most suitable spacer composition for most uses will contain about equal volumes of water and oil. In any case, the spacer fluid will be a relatively weak (balanced) water-in-oil (invert) emulsion. In other words, the interfacial tension forces in the emulsion are balanced so that the emulsion can easily flip or revert and become an oil-in-water emulsion to maintain compatibility with a water base mud when it is used adjacent such drilling muds. The "balance" of the spacer fluid emulsions of the invention is an important factor in permitting them to be compatible with substantially all drilling muds and cements currently in use.

Where the amount of oil used in the spacer fluid exceeds a volume ratio of water of about 1.5:1, we have observed that the cement adjacent the spacer undergoes an undesirable reduction in setting time. Where the ratio drops below about 1:1.5, the ability to maintain the continuity of the oil phase is lost, and the fluid becomes an oil-in-water emulsion. The ability to vary the oil-to-water ratio within the specified range imparts greater flexibility to the selective tailoring of the viscosity and weight of the spacer fluid. In this regard, it should be understood that as the term weight is used in this application and in the claims, other than where the terminology weight percent or parts by weight is being employed, it is used as a term of art referring in actuality to a density parameter, usually expressed in either pounds per barrel (ppb), or pounds per gallon (ppg).

The use of the powerful surfactant dispersant material in the spacer fluid permits it to be weighted as may be desired over a wide range of about 8-20 pounds per gallon, and this material also functions to oil wet any cement solids that may migrate into the spacer fluid from the adjacent cement slurry. Further, the emulsion fluids are compatible with all types of cement slurries utilized in the cementing of wells upon completion, and does not increase the viscosity or change the pumping time of such cements.

In use, the spacer fluid of the invention is pumped into a well being completed behind the drilling mud to circulate the mud out of the well, and is displaced ahead of the cement column circulated into the well for cementing purposes. It will generally be preferred to weight the spacer fluid to a weight between the cement and mud, which is usually to a weight slightly heavier than the weight of the drilling mud that it is displacing, and slightly lighter than the cement which follows the spacer.

The following examples illustrate various embodiments of the invention and teach one skilled in the art how to use the invention and various obvious embodiments thereof. Reference to the preferred surfactant dispersant refers to a mixture of equal weight parts of waste sulfite liquor and an oleyl amide derived from the reaction of oleyl chloride with N-methyltaurine.

EXAMPLE 1

A 21,000-foot well was drilled in a California location, and has a bottom hole circulating temperature of 310° F. In completing the well, the mud used in drilling the well is displaced through the annulus between the casing and the well bore by the use of a spacer fluid interposed between the mud and the cement following the spacer fluid for purposes of cementing the casing. The mud employed has a density of 18 pounds per gallon, and is a lignosulfonate-containing water base mud. The cement used is an API Class G cement having a weight of 14.4 pounds per gallon, and is modified by the inclusion of small amounts of sodium chloride, silica flour, iron oxide and an appropriate retarder.

The spacer fluid formulated in accordance with the present invention and used between the cement and mud has a weight of 18.2 pounds per gallon achieved using barium sulfate as a weighting material. The spacer fluid emulsion contains water and oil in a 50—50 volume ratio, and has incorporated therein, 25 pounds per barrel of an emulsifier which contains 68.1 weight percent of powdered slaked lime having adsorbed on its surface, 4.9 weight percent oleyl amide derived from the consensation of oleic acid with diethanolamine, 5 weight percent undistilled oleic acid, 5 weight percent red oil, and 10 weight percent undistilled dimerized oleic acid. The spacer fluid also contains 4 pounds per barrel of the preferred surfactant dispersant used in the spacer fluids of the invention. Finally, the spacer fluid used contains 12 weight percent of an asphaltic resin incorporated to reduce fluid loss.

The mud and cement utilized in the California cementing run are not compatible. Fifty barrels of the spacer is used between the mud and cement.

The critical velocities at which the transition from laminar to turbulent flow occurs are measured and evaluated for the drilling mud alone, the spacer fluid alone, a mixture of the spacer fluid and the cement used, and a mixture of spacer fluid and the drilling mud. The temperature at which the critical velocity tests are carried out is 200° F. The critical velocities are measured for various annulus sizes as determined by the difference in the hole diameter and the casing outside diameter. The results of these runs are set forth in Table I.

TABLE I

|  | Critical Velocity - Feet per Minute Hole Dia. Minus Casing O.D., Inches | | | | | |
| --- | --- | --- | --- | --- | --- | --- |
|  | 1 | 2 | 3 | 4 | 5 | 6 |
| Drilling Mud | 470 | 370 | 320 | 290 | 270 | 250 |
| Spacer Fluid | 355 | 230 | 175 | 145 | 125 | 115 |
| Spacer Fluid + 50% Cement | 325 | 240 | 205 | 180 | 165 | 150 |
| Spacer Fluid + 50% Mud | 340 | 250 | 210 | 185 | 170 | 155 |

The results of the critical velocity measurement indicate that substantially lower critical velocities are obtained for mixtures of the spacer fluid with either cement or mud, than in the case of the mud alone. There is therefore no detrimental increase in viscosity, and a greater ease in achieving turbulent flow is realized where any significant mixing of the spacer fluid with either the mud or the cement occurs.

EXAMPLE 2

Certain tests are carried out preliminary to the completion of a well in East Texas. The well is 9700 feet in depth, and has a bottom hole circulating temperature of 250° F. The mud used in drilling the well is 14 pounds per gallon oil base mud, and the API Class H cement to be used in completing the well has a density of 15.8 pounds per gallon. The cement includes 18 percent sodium chloride, a small amount of a commercially available friction reducer and a small amount of retarder.

A spacer fluid constituted as described in Example 1, but weighted by the use of barium sulfate to a weight of 14 pounds per gallon, is selected for placement between the mud and cement. To determine the effects on viscosity which might be expected to occur as a result of some contamination occurring at the interface between the spacer fluid and the mud, as well as between the spacer fluid and the cement, several tests are conducted with a Fann Viscosimeter, and the results of these evaluations are set forth in Table II.

TABLE II

| Percent By Volume Contamination | Contamination Tests - 600/300 Fann Reading | | |
| --- | --- | --- | --- |
|  | Mud + Cement | Mud + Spacer Fluid | Cement + Spacer Fluid |
| 0 | 300+/300+ | 300+/260 | 63/30 |
| 10 | 300+/276 | 300+/210 | 59/33 |
| 20 | 300+/300+ | 295/177 | 62/37 |
| 30 | 300+/300+ | 257/152 | 61/38 |
| 40 | 300+/300+ | 202/133 | 58/38 |
| 50 | 300+ 300+ | 204/118 | 56/36 |

The results appearing in Table II show that the viscosities developed in the Fann tests for the type of mixing which can conceivably occur at the interface between the spacer fluid and mud are much lower than those which would occur, without the use of the spacer, at the interface between the mud and cement. The same is true of the viscosities developed at the interface between the spacer fluid and the cement, assuming varying amounts of contamination up to a 50—50 volumetric ratio of contamination.

EXAMPLE 3

For the purpose of completing a 20,000-foot well drilled in Oklahoma, and having a bottom hole circulating temperature of 300° F, a spacer fluid, constituted as described in Example 1, is made up in accordance with the present invention for placement between a water base, ferro chrome-lignosulfonate drilling mud having a density of 10.7 pounds per gallon, and a cement having a density of 12.8 pounds per gallon. The spacer fluid is weighted with barium sulfate to a weight of 11.5 pounds per gallon. Fann Viscosimeter tests of the type described in Example 2 are then carried out to examine the effects upon the viscosity of the system of the commingling or intermixing occurring at the interfaces of the spacer fluid with the cement and with the mud, as compared to the viscosity effect resulting from intermingling of the mud with the cement where no spacer fluid is employed. The results are set forth in Table III.

TABLE III

| Percent by Volume Contamination | Contamination Tests - 600/300 Fann Reading | | |
| --- | --- | --- | --- |
|  | Mud + Cement | Mud + Spacer Fluid | Cement + Spacer Fluid |
| 20 | 133/82 | 97/58 | 33/22 |
| 30 | 156/94 | 97/58 | 32/20 |
| 40 | 182/109 | 105/60 | 27/17 |
| 50 | 230/135 | 105/60 | 26/17 |

EXAMPLE 4

An 18,000-foot well having a bottom hole circulating temperature of 283° F drilled in Louisiana, using an oil base mud having a density of 17.5 pounds per gallon, is to be completed with an API Class H cement having a density of 18.1 pounds per gallon. The cement contains an iron oxide weighting agent, silica flour and a small amount of commercially available retarder.

A spacer fluid is made up for interposition between the cement and mud, and has a weight of 16.8 pounds per gallon achieved by weighting with barium sulfate. The spacer fluid otherwise has the composition of the spacer fluid referred to in Example 1. Fann Viscosimeter tests are carried out on the spacer fluid in admixture with both the mud and the cement, and the results are compared with Fann viscosity readings carried out on various mixtures of cement and mud. The results are set forth in Table IV.

TABLE IV

| Percent By Volume Contamination | Contamination Tests - 600/300 Fann Reading | | |
| --- | --- | --- | --- |
|  | Mud + Cement | Mud + Spacer Fluid | Cement + Spacer Fluid |
| 0 | 300+/21 | 129/73 | 224/132 |
| 10 | 293/170 | 98/58 | 194/116 |
| 20 | 300+/250 | 94/55 | 116/105 |
| 30 | 300+/243 | 90/51 | 155/100 |
| 40 | 300+/276 | 84/48 | 137/83 |
| 50 | 300+/300+ | 81/45 | 157/93 |

EXAMPLE 5

Four spacer compositions are made up with each containing 108 milliliters of No. 2 diesel oil and an equal volume of water. Each composition also contains 1.5 pounds per barrel of oleic acid; 1.5 pounds per barrel of oleyl amide (condensation product of oleic acid and diethanolamine); 1.5 pounds per barrel of dimerized oleic acid and 525 pounds per barrel of barium sulfate as a weighting material. The amounts and kinds of solid carrier substrate material in the emulsifier composition is varied in the four compositions, as is the amount of surfactant dispersant. These variations in composition are as follows:

Composition A — 20 lbs/bbl of calcium oxide and four lbs/bbl of the preferred dispersant surfactant herein before described;

Composition B — same as Composition A, but no lime or other solid carrier included;

Composition C — same as Composition B, except that five lbs/bbl of the preferred dispersant surfactant are used;

Composition D — same as Composition A, except that two lbs/bbl of sodium hydroxide are used instead of the calcium hydroxide.

For the purpose of evaluating viscosities and determining the voltage breakdown characteristics of the spacer fluid compositions, voltage breakdown and Fann Viscosimeter tests are conducted on the Compositions, A, B and C. Composition D does not make an emulsion, indicating that sodium hydroxide can not be substituted as a carrier material for the calcium hydroxide. The results of the viscosity and voltage breakdown tests are set forth in Table V.

TABLE V

|  | Composition | | |
|---|---|---|---|
|  | A | B | C |
| Apparent Viscosity | 95 | 150+ | 150+ |
| 600 Fann Reading | 190 | 300+ | 300+ |
| 300 Fann Reading | 140 | 300+ | 244 |
| Plastic Viscosity | 50 | — | — |
| Yield Point | 90 | — | — |
| 200 Fann Reading | 118 | 286 | 207 |
| 100 Fann Reading | 86 | 227 | 163 |
| 6 Fann Reading | 31 | 93 | 69 |
| 3 Fann Reading | 27 | 49 | 39 |
| Voltage Breakdown | 70 | 74 | 34 |

The results set forth in Table V show that eliminating the solid carrier [$Ca(OH)_2$] results in the spacer fluid (Composition B) having a viscosity which is too high for the spacer fluid to be usable. The addition of 25 percent more surfactant dispersant to Composition C does not adequately lower the viscosity to correct this problem.

EXAMPLE 6

To a blend of 108 milliliters of No. 2 diesel oil and 108 milliliters of fresh water, various components of the spacer fluid composition of the invention are added, except for the oleyl amide of the emulsifier. Eight compositions are formulated in this way, and their voltage breakdown characteristics then determined. Table VI shows the constitution of the several compositions and the voltage breakdowns obtained.

TABLE VI

| Component | Composition, lbs/bbl | | | | | | | |
|---|---|---|---|---|---|---|---|---|
|  | 1 | 2 | 3 | 4 | 5* | 6* | 7 | 8 |
| Dimerized oleic acid | 2.5 | 2.5 | 2.5 | 2.5 | 1.5 | 1.5 | 3.5 | 2.5 |
| Asphaltenes | — | 4.0 | 4.0 | 4.0 | 2.0 | 2.0 | 2.0 | — |
| Dispersant Surfactant | — | — | 4.0 | 4.0 | 1.0 | 5.0 | 5.0 | 8.0 |
| Barite | — | — | — | 525 | — | — | 525 | — |

TABLE VI-continued

| Component | Composition, lbs/bbl | | | | | | | |
|---|---|---|---|---|---|---|---|---|
|  | 1 | 2 | 3 | 4 | 5* | 6* | 7 | 8 |
| Voltage Breakdown** | 20 | 12 | 50 | — | 16 | 0 | — | — |

*The solid components are here all added together into the diesel oil which is then added to the fresh water.
**Compositions 4 and 7 are too thick to accept and allow mixing in of all the barite. In the case of Composition 8, the emulsion breaks during the adding of the barite.

The poor results realized when the oleyl amide emulsifying agent, used in the emulsifier, and the solid carrier (lime, etc.) are omitted demonstrate the importance of the inclusion of these components.

EXAMPLE 7

A number of compositions are prepared each containing 151 milliliters of No. 2 diesel oil, 151 milliliters of fresh water and 110 pounds per barrel of 4.23 gravity barite. The other components of the compositions are varied as follows:

| Component | Composition, lbs/bbl | | | | | | | |
|---|---|---|---|---|---|---|---|---|
|  | 1 | 2 | 3 | 4 | 5 | 6 | 7 | 8 |
| Oleyl amide* | 1.5 | — | — | 1.5 | 1.5 | — | 1.5 | 1.5 |
| Dimerized oleic acid | — | 2.5 | — | 2.5 | — | 2.5 | 2.5 | 2.5 |
| Oleic acid | — | — | 2.5 | — | 2.5 | 2.5 | 2.5 | 2.5 |
| Friction Reducer** | — | — | — | — | — | — | — | 2.0 |

*Reaction product of oleic acid and diethanolamine.
**A derivative of dodecylbenzene sulfonic acid.

The Fann Viscosimeter and voltage breakdown tests previously described are carried out on the eight compositions. The results obtained appear in Table VII.

TABLE VII

|  | Composition | | | | | | | |
|---|---|---|---|---|---|---|---|---|
|  | 1 | 2 | 3 | 4 | 5 | 6 | 7 | 8 |
| 600 Reading | 40 | 174 | 53 | 175 | 58 | 80 | 83 | 77 |
| 300 Reading | 21 | 165 | 27 | 142 | 31 | 50 | 59 | 57 |
| Plastic Viscosity | 19 | 9 | 26 | 33 | 27 | 30 | 24 | 20 |
| Yield Point | 2 | 156 | 1 | 109 | 4 | 20 | 35 | 37 |
| 200 Reading | 15 | 158 | 32 | 122 | 27 | 38 | 48 | 47 |
| 100 Reading | 10 | 137 | 23 | 96 | 14 | 25 | 35 | 35 |
| 6 Reading | 3 | 24 | 7 | 37 | 3 | 8 | 13 | 12 |
| 3 Reading | 2 | 18 | 5 | 32 | 2 | 5 | 10 | 8 |
| Voltage Breakdown | 72 | 100 | 100 | 60 | 62 | 100 | 60 | 20 |

The data in Table VII demonstrate the need for inclusion of the dimerized oleic acid in the composition in order to achieve adequate weight supporting capacity (yield point of at least 8), but further show that when used alone or at a relatively high concentration, the dimerized acid tends to increase the viscosity of the composition to a higher than optimum level.

EXAMPLE 8

Ten pounds per barrel of CaO are added to each of the eight compositions constituted as described in Example 7. Viscosity and voltage breakdown tests of the thus modified compositions yield the following results:

TABLE VIII

|  | Composition | | | | | | | |
|---|---|---|---|---|---|---|---|---|
|  | 1 | 2 | 3 | 4 | 5 | 6 | 7 | 8 |
| 600 Reading | 42 | 115 | 64 | 145 | 60 | 100 | 80 | 92 |
| 300 Reading | 22 | 82 | 37 | 114 | 35 | 70 | 55 | 67 |
| Plastic Viscosity | 20 | 33 | 27 | 31 | 25 | 30 | 25 | 25 |
| Yield Point | 2 | 49 | 10 | 83 | 10 | 40 | 30 | 42 |
| 200 Reading | 15 | 72 | 27 | 95 | 25 | 60 | 45 | 55 |
| 100 Reading | 9 | 64 | 15 | 73 | 17 | 52 | 22 | 40 |
| 6 Reading | 3 | 11 | 4 | 30 | 5 | 14 | 11 | 14 |
| 3 Reading | 2 | 7 | 3 | 24 | 4 | 7 | 9 | 11 |

TABLE VIII-continued

| | Composition | | | | | | | |
|---|---|---|---|---|---|---|---|---|
| | 1 | 2 | 3 | 4 | 5 | 6 | 7 | 8 |
| Voltage Breakdown | 29 | 80 | 0 | 66 | 60 | 52 | 60 | 40 |

The properties of the spacer fluid emulsions are shown by the data to be generally improved by the addition of the particulate calcium oxide from the standpoint of gel structure and long term stability. However, when used strictly for a spacer fluid and not a drilling fluid or packer fluid, the calcium is detrimental to its compatibility with water base muds.

EXAMPLE 9

Nine emulsion fluid compositions are prepared, each containing equal volumes of No. 2 diesel oil and fresh water, and each containing four pounds per barrel of the preferred surfactant dispersant (a mixture of equal weight parts of waste sulfite liquor and the methyl taurine derived oleyl amide). The remaining components of the several compositions are varied as shown in Table IX, which also shows the density, in pounds per gallon, of each of the resulting fluids.

TABLE IX

| | Composition | | | | | | | | |
|---|---|---|---|---|---|---|---|---|---|
| | 1 | 2 | 3 | 4 | 5 | 6 | 7 | 8 | 9 |
| Diesel No. 2, ml. | 153 | 121 | 102 | 153 | 121 | 102 | 153 | 121 | 102 |
| Fresh water | 153 | 121 | 102 | 153 | 121 | 102 | 153 | 121 | 102 |
| Emulsifier, lbs/bbl* | 25 | 25 | 25 | 20 | 20 | 20 | 15 | 15 | 15 |
| Barite, lbs/bbl | 110 | 375 | 537 | 110 | 375 | 537 | 110 | 375 | 537 |
| Density, lbs/gal | 10 | 15 | 18 | 10 | 15 | 18 | 10 | 15 | 18 |

*The emulsifier used has the following composition:

| Component | Weight Percent |
|---|---|
| Calcium oxide | 56 |
| Oleyl amide | 4 |
| Oleic acid | 10 |
| Dimerized oleic acid | 10 |
| Dispersant surfactant | 8 |
| Asphaltenes | 12 |

The Fann Viscosimeter and voltage breakdown values for the compositions are determined, and are set forth in Table X.

EXAMPLE 10

| | Composition | | | | | | | | |
|---|---|---|---|---|---|---|---|---|---|
| | 1 | 2 | 3 | 4 | 5 | 6 | 7 | 8 | 9 |
| 600 Reading | 100 | 140 | 300+ | 71 | 146 | 282 | 58 | 112 | 300+ |
| 300 Reading | 69 | 85 | 190 | 45 | 88 | 162 | 33 | 61 | 171 |
| Plastic Viscosity | 31 | 55 | — | 26 | 58 | 120 | 25 | 51 | — |
| Yield Point | 38 | 30 | — | 19 | 30 | 42 | 8 | 10 | — |
| 200 Reading | 55 | 62 | 143 | 34 | 64 | 116 | 24 | 44 | 129 |
| 100 Reading | 38 | 36 | 84 | 21 | 38 | 66 | 13 | 24 | 75 |
| 6 Reading | 8 | 6 | 11 | 3 | 4 | 9 | 2 | 3 | 10 |
| 3 Reading | 5 | 4 | 8 | 2 | 3 | 5 | 1.5 | 2 | 5 |
| Voltage Breakdown | 200 | 124 | 160 | 200 | 160 | 124 | 124 | 80 | 82 |

In using the emulsifier composition for preparing the improved water-in-oil emulsions of the present invention, a quantity of oil which may be diesel oil, crude oil, kerosene, other liquid aliphatic hydrocarbons or mixtures of the foregoing is placed in a mixing pit or container and agitated using conventional mixing apparatus. The emulsifier composition is next slowly added and mixed with the oil in a total amount of about 15–50 pounds of emulsifier per barrel of oil used. The water used, generally a quantity of about 5–60% by volume of oil used, is added to the mixing pit or container and the mixture is continuously agitated for a period of 30 minutes to an hour after all the water has been added. The weighting material used is next added to the mixture and mixing is continued for 30 minutes to an hour after combining all of the weighting material. Once the water-in-oil emulsion has been formed having the desired weight and other characteristics, it is utilized in drilling operations in a conventional manner.

EXAMPLE 11

In order to illustrate the various improved water-in-oil emulsion drilling fluids which can be prepared as well as the quantities of the oil, water and other components required to prepare the drilling fluid, Table XI is presented below. In Table XI the quantities of barite (barium sulfate), calcium chloride brine and No. 1 diesel oil are shown for preparing 100 barrels of various weights of inverted emulsion drilling fluid as well as the quantities of emulsifier composition required. Table XI is based on the following emulsifier composition:

| Component | Weight % |
|---|---|
| Powdered lime | 61.6 |
| Oleyl amide | 3.9 |
| Undistilled oleic acid | 5.1 |
| Red oil | 5.1 |
| Undistilled dimerized oleic acid | 10.3 |
| Dispersing Agent | 2.0 |
| Asphaltic resin | 12.0 |
| | 100.0 |

TABLE XI
COMPOSITIONS OF VARIOUS WATER-IN-OIL EMULSION DRILLING FLUIDS

| Emulsion Weight Pounds/Gallon | Oil-Water Ratio, Volume % | Weighting Material (Barite) Used, Pounds | No. 1 Diesel (10 ppg CaCl$_2$) Oil Used, Barrels | Brine Emulsifier Used, Used Barrels | Pounds Per Barrel of Oil |
| --- | --- | --- | --- | --- | --- |
| 8.5 | 60–40 | 225.0 | 57.3 | 38.0 | 25.0 |
| 9.0 | 61–39 | 1,640.0 | 57.0 | 36.4 | 25.0 |
| 9.5 | 62–38 | 3,025.0 | 56.8 | 34.8 | 24.5 |
| 10.0 | 63–37 | 4,500.0 | 56.5 | 33.2 | 24.0 |
| 10.5 | 64–36 | 5,915.0 | 56.2 | 31.7 | 23.5 |
| 11.0 | 65–35 | 7,360.0 | 56.0 | 30.1 | 23.0 |
| 11.5 | 66–34 | 8,800.0 | 55.6 | 28.6 | 22.5 |
| 12.0 | 67–33 | 10,235.0 | 55.2 | 27.2 | 22.0 |
| 12.5 | 68–32 | 11,665.0 | 54.8 | 25.8 | 21.5 |
| 13.0 | 69—31 | 13,125.0 | 54.3 | 24.4 | 21.0 |
| 13.5 | 70–30 | 14,530.0 | 53.8 | 23.1 | 20.5 |
| 14.0 | 71–29 | 15,950.0 | 53.3 | 21.8 | 20.0 |
| 14.5 | 72–28 | 17,375.0 | 52.7 | 20.5 | 19.5 |
| 15.0 | 73–27 | 18.790.0 | 52.1 | 19.3 | 19.0 |
| 15.5 | 74–26 | 20,470.0 | 51.3 | 18.0 | 18.5 |
| 16.0 | 75–25 | 21,620.0 | 50.8 | 17.0 | 18.0 |
| 16.5 | 76–24 | 23,030.0 | 50.2 | 15.8 | 17.5 |
| 17.0 | 77–23 | 24,360.0 | 49.5 | 14.8 | 17.0 |
| 17.5 | 78–22 | 25,845.0 | 48.7 | 13.7 | 16.5 |
| 18.0 | 79–21 | 27,245.0 | 47.9 | 12.7 | 16.0 |
| 18.5 | 80–20 | 28,640.0 | 47.0 | 11.8 | 15.5 |
| 19.0 | 81–19 | 30,040.0 | 46.2 | 10.8 | 15.0 |

I claim:

1. A water-in-oil emulsion spacer fluid which is compatible with drilling fluids and cement compositions and which can be used effectively in a well to separate various types of fluids, cement compositions and combinations thereof without significant alteration in the rheological properties, said spacer fluid comprising about 40–60 parts by volume of a hydrocarbon oil; about 40–60 parts by volume fresh water having, before inclusion of the spacer fluid, a dissolved chloride salt content of less than 1,000 parts per million and a total hardness of less than 500 parts per million; and about 15–40 pounds of an emulsifier composition per barrel of said spacer fluid; said emulsifier composition consisting essentially of about 1–20 weight percent of a first fatty acid amide, wherein the fatty acid precursor contains about 12–18 carbon atoms and the amide contains about 16–22 carbon atoms and about 0.5–10 pounds per barrel of spacer fluid of a surfactant-dispersant comprising a mixture of sulfonated lignin and a second fatty acid amide; wherein for said surfactant-dispersant, said sulfonated lignin is mixed with said second fatty acid amide in an amount equal to about 25–75% of said mixture; wherein said first fatty acid amide is the reaction product of a di-lower alkanol amine and said fatty acid; and wherein the amine precursor of the second fatty acid amide is an alkyl or aryl amino sulfonic acid, wherein the alkyl or aryl radicals contain 1–6 carbon atoms.

2. A water-in-oil emulsion spacer fluid of claim 1 wherein said emulsifier composition consists essentially of about 1–20 weight percent of said first fatty acid amide on a solid particulate carrier material.

3. A water-in-oil emulsion spacer fluid of claim 2 wherein said solid particulate carrier material selected from the group consisting of calcium oxide, calcium hydroxide, magnesium oxide, diatomaceous earth and combinations thereof.

4. A water-in-oil emulsion spacer fluid of claim 3 wherein said emulsifier composition is further characterized as including up to about 30 weight percent dimerized oleic acid.

5. A water-in-oil emulsion spacer fluid of claim 3 wherein said emulsifier composition is further characterized as including about 3–15 weight percent oleic acid.

6. A water-in-oil emulsion spacer fluid of claim 5 wherein said spacer fluid is further characterized as including a weighting material in an amount effective to impart a weight of about 8–20 pounds per gallon of said spacer fluid.

7. A water-in-oil emulsion spacer fluid of claim 6 wherein said hydrocarbon oil is diesel oil, crude oil, kerosene or a combination thereof.

8. A spacer fluid composition as defined in claim 3 wherein said emulsifier composition is further characterized in including up to 30 weight percent dimerized oleic acid; and said spacer fluid emulsion composition is further characterized in including a weighting material in an amount effective to impart a weight of from about 8 pounds per gallon to about 20 pounds per gallon to the spacer fluid emulsion composition.

9. A spacer fluid composition as defined in claim 5 wherein said spacer fluid composition is further characterized in including about 1–20 weight percent of a particulated asphalt resin, based on the total weight of the emulsifier composition included in the spacer fluid composition.

10. A spacer fluid composition as defined in claim 3 wherein said surfactant-dispersant composition comprises substantially equal weight parts of waste sulfite liquor and an oleyl amide derived from the reaction of oleyl chloride with said amino sulfonic acid.

11. A spacer fluid composition as defined in claim 3 wherein said emulsifier composition contains about 65–70 weight percent of calcium hydroxide as the particulate carrier and about 3–10 weight percent of oleyl amide as the first fatty acid amide.

12. A spacer fluid composition as defined in claim 11 wherein said emulsifier composition is further characterized in including about 3–15 weight percent of oleic acid.

13. An emulsifier for preparing a water-in-oil emulsion having good stability at high temperatures and to the addition of weighting material to said emulsion comprising a basic emulsifier consisting essentially of the reaction product of oleic acid and diethanolamine to form an oleyl amide, said reaction product being present in an amount in the range of about 1-20% by weight and a surfactant-dispersant agent being present in an amount in the range of about 0.5-20% by weight; said surfactant-dispersant comprising a mixture of sulfonated lignin mixed with a fatty acid amide, wherein the fatty acid precursor contains 12-18 carbon atoms and the amine precursor is an alkyl or aryl amino sulfonic acid, wherein the alkyl or aryl radicals contain 1-6 carbon atoms; and wherein the fatty acid amide is mixed with said sulfonated lignin in an amount equal to about 25-75% of said mixture.

14. An emulsifier as defined in claim 13; wherein said basic emulsifier consists essentially of a mixture of the reaction product of oleic acid and diethanolamine mixed with dimerized oleic acid; said reaction product being present in an amount in the range of about 1-20% by weight of said mixture; said dimerized oleic acid being present in about 2-20% by weight of said mixture; and said surfactant-dispersant being present in the range of about 0.5-20% by weight of said mixture.

15. An emulsifier as defined in claim 13 consisting essentially of a mixture of the reaction product of oleic acid and diethanolamine mixed with dimerized oleic acid and oleic acid; said reaction product being present in an amount in the range of about 1-20% by weight of said mixture; said dimerized oleic acid being present in about 2-20% by weight of said mixture; said oleic acid being in about 3-40% by weight of said mixture; and said surfactant-dispersant being present in an amount in the range of about 0.5-20% by weight of said mixture.

16. An emulsifier of claim 13 wherein said reaction product and dispersing agent are mixed with a powdered solid carrier selected from diatomaceous earth, calcium oxide, calcium hydroxide, magnesium oxide and mixtures thereof; said reaction product being present in an amount in the range of about 1-20% by weight and said dispersing agent being present in an amount in the range of about 0.5-20% by weight.

17. An emulsifier of claim 13 wherein said reaction product and surfactant-dispersant are mixed with particulated solid asphaltic material and a powdered solid carrier selected from diatomaceous earth, calcium oxide, calcium hydroxide, magnesium oxide and combinations thereof to form a powder emulsifier; said reaction product being present in an amount in the range of about 1-20% by weight and said surfactant-dispersant being present in an amount in the range of about 0.5-20% by weight.

18. A water-in-oil emulsion drilling fluid having good stability at high temperature and to the addition of weighting materials comprising oil, water, a basic emulsifier and a surfactant-dispersant effective for dispersing conventional weighting materials in said emulsion comprising a mixture of liquid oleyl amide and sulfonated lignin; said basic emulsifier consisting essentially of a mixture of the reaction product of oleic acid and diethanolamine to form an oleyl amide mixed with dimerized oleic acid; wherein the liquid oleyl amide of said surfactant-dispersant is mixed with the sulfonated lignin in an amount equal to 25-75% of said mixture and the amine precursor is an alkyl or aryl amino sulfonic acid; wherein the alkyl or aryl radicals contain 1-6 carbon atoms; and wherein the dimerized oleic acid is present in said mixture in an amount up to about 30%.

19. A water-in-oil emulsion drilling fluid as defined in claim 18 comprising oil, water, a basic emulsifier, a surfactant-dispersant and particulate solid material; said basic emulsifier consisting essentially of a mixture of the amide reaction product of oleic acid and diethanolamine to form a first oleyl amide mixed with dimerized oleic acid and oleic acid; wherein said oleic acid is present in an amount of about 3-40% of said mixture; said surfactant-dispersant being prepared by mixing a second oleyl amide with sulfonated lignin in the form of waste sulfite liquor; said second oleyl amide being the reaction product of oleic acid and an alkyl amino sulfonic acid containing 2-6 carbon atoms; and said particulate solid material being diatomaceous earth, calcium oxide, calcium hydroxide, magnesium oxide, particulated solid asphaltic material or combinations thereof.

* * * * *